United States Patent
Jing et al.

(10) Patent No.: US 11,549,004 B2
(45) Date of Patent: Jan. 10, 2023

(54) POLYOLEFIN COMPOSITION

(71) Applicant: SABIC GLOBAL TECHNOLOGIES B.V., Bergen Op Zoom (NL)

(72) Inventors: Guo Jing, Shanghai (CN); Liu Xiqiang, Shanghai (CN); Jiang Chaodong, Shanghai (CN); Qian Shengying, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/651,387

(22) PCT Filed: Oct. 3, 2018

(86) PCT No.: PCT/EP2018/076888
§ 371 (c)(1),
(2) Date: Mar. 27, 2020

(87) PCT Pub. No.: WO2019/068747
PCT Pub. Date: Apr. 11, 2019

(65) Prior Publication Data
US 2020/0239676 A1 Jul. 30, 2020

(30) Foreign Application Priority Data
Oct. 3, 2017 (EP) .................................... 17194610

(51) Int. Cl.
*C08L 23/08* (2006.01)
*C08L 23/12* (2006.01)
*C08L 53/02* (2006.01)

(52) U.S. Cl.
CPC ........... *C08L 23/12* (2013.01); *C08L 23/0815* (2013.01); *C08L 53/025* (2013.01); *C08L 2203/02* (2013.01); *C08L 2203/10* (2013.01); *C08L 2203/16* (2013.01); *C08L 2205/03* (2013.01); *C08L 2207/04* (2013.01); *C08L 2207/064* (2013.01)

(58) Field of Classification Search
CPC .......... C08L 23/10; C08L 23/12; C08L 23/14; C08L 23/142; C08L 23/08; C08L 23/0807; C08L 23/0815; C08L 53/00; C08L 53/02; C08L 53/025; C08L 2205/03
See application file for complete search history.

(56) References Cited

U.S. PATENT DOCUMENTS

| 6,261,655 | B1 | 7/2001 | Rosenbaum et al. |
| 9,040,132 | B2 | 5/2015 | Choi et al. |
| 2008/0221256 | A1* | 9/2008 | Kanzaki .................. C08L 53/00 524/505 |
| 2014/0072743 | A1 | 3/2014 | Stephenne et al. |

FOREIGN PATENT DOCUMENTS

| EP | 0994153 A1 * | 4/2000 |
| EP | 1840164 A1 | 10/2007 |
| EP | 2100916 A1 * | 9/2009 |
| WO | 2004071375 A1 | 8/2004 |

OTHER PUBLICATIONS

International Search Report for International Application No. PCT/EP2018/076888, International Filing Date Oct. 3, 2018, dated Dec. 7, 2018, 4 pages.
Written Opinion for International Application No. PCT/EP2018/076888, International Filing Date Oct. 3, 2018, dated Dec. 7, 2018, 5 pages.

* cited by examiner

*Primary Examiner* — Irina S Zemel
*Assistant Examiner* — Jeffrey S Lenihan
(74) *Attorney, Agent, or Firm* — Cantor Colburn LLP

(57) ABSTRACT

The invention relates to a composition comprising: (A) a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms, (B) an elastomer of ethylene and an α-olefin comonomer having 4 to 10 carbon atoms, wherein the elastomer has a density of 0.850 to 0.865 g/cm 3 and a melt flow index of 0.1 to 20 dg/min measured in accordance with ASTM D1238 using a 2.16 kg weight and at a temperature of 190° C. and (C) a block copolymer comprising a terminal block comprising styrene or alpha-methylstyrene.

12 Claims, No Drawings

POLYOLEFIN COMPOSITION

CROSS REFERENCE TO RELATED APPLICATIONS

This application is a National Stage application of PCT/EP2018/076888, filed Oct. 3, 2018, which claims the benefit of European Application No. 17194610.6, filed Oct. 3, 2017, both of which are incorporated by reference in their entirety herein.

BACKGROUND

The present invention relates to a polyolefin composition and an article comprising such polyolefin composition.

Packaging applications are important for polyolefin compositions, also in the medical area and for pharmaceutical packaging where the material is mostly sterilised. Especially in food packaging and medical applications, films have to be sterilised. The most common sterilisation procedures are the use of heat (steam), radiation (beta radiation, electrons or gamma radiation) or chemicals (usually ethylene oxide). This sterilisation procedure usually affects the mechanical and optical properties, and decreases the sealing strength.

Use of a composition comprising a propylene polymer and styrene-ethylene-butadiene-styrene block copolymer in a medical multilayer film is known. The composition may further comprise an ethylene copolymer, which has a cost advantage compared to a composition consisting of a propylene polymer and styrene-ethylene-butadiene-styrene block copolymer. For example, U.S. Pat. No. 9,040,132 discloses a multilayer film comprising a layer comprising a copolymer of propylene, ethylene and 1-butene, a copolymer of ethylene and alph-olefin and styrene-ethylene-butadiene-styrene block copolymer. U.S. Pat. No. 6,261,655 discloses a multilayer film comprising a layer comprising polypropylene, ultra-low density polyethylene and styrene-ethylene-butadiene-styrene block copolymer.

There is a need in the art for a polyolefin composition having a good sealing strength even after sterilisation.

SUMMARY

It is an objective of the present invention to provide a polyolefin composition in which the above-mentioned and/or other problems are solved.

Accordingly, the present invention provides a composition comprising:
(A) a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms,
(B) an elastomer of ethylene and an α-olefin comonomer having 4 to 10 carbon atoms, wherein the elastomer has a density of 0.850 to 0.865 g/cm$^3$ and a melt flow index of 0.1 to 20 dg/min measured in accordance with ASTM D1238 using a 2.16 kg weight and at a temperature of 190° C. and
(C) a block copolymer comprising a terminal block comprising styrene or alpha-methylstyrene.

It was surprisingly found that the use of the elastomer (B) in combination with the propylene-based polymer (A) and the block copolymer (C) for making a sealing film resulted in a high sealing strength of the sealing film even after sterilisation. The film may also have a good transmittance and a good tensile strength.

DETAILED DESCRIPTION (A) Propylene-Based Polymer

The composition according to the invention comprises (A) a propylene-based polymer. The propylene-based polymer may be a propylene homopolymer or a propylene copolymer with at most 10 wt % of comonomer units. The comonomer units may be ethylene monomer units and/or an α-olefin monomer units having 4 to 10 carbon atoms.

Preferably, the propylene-based polymer is a random propylene-ethylene copolymer consisting of 90 to 99 wt % of propylene monomer units and 1 to 10 wt % of ethylene monomer units.

Preferably, the propylene-based polymer has a melt flow rate of from 0.5 to 30 dg/min, for example 1 to 20 dg/min or 1.5 to 10 dg/min, as measured according to ISO1133 (2.16 kg, 230° C.).

Preferably, the propylene-based polymer has a xylene soluble content at 25° C. of 4 to 10 wt %.

Preferably, the amount of the propylene-based polymer in the composition is 10 to 50 wt %, for example 20 to 40 wt %, with respect to the total composition (100 wt %).

(B) Copolymer of Ethylene and α-Olefin Having 4 to 10 Carbon Atoms

The composition according to the invention comprises (B) a copolymer of ethylene and an α-olefin having 4 to 10 carbon atoms. Preferably, the copolymer (B) is a copolymer of ethylene and 1-octene.

The copolymer (B) has a density of 0.850 to 0.865 g/cm$^3$.

Preferably, the copolymer (B) has a density of 0.850 to 0.860 g/cm$^3$. This results in a very high sealing strength of the sealing film even after sterilisation. Alternatively, the copolymer (B) has a density of 0.860 to 0.865 g/cm$^3$. This results in a composition with a high transmittance and tensile strength.

The copolymer (B) has a melt flow rate of from 0.1 to 20 dg/min, for example 0.1 to 5 dg/min as measured according to ISO 1133 using a 2.16 kg weight and at a temperature of 190° C.

Preferably, the amount of the copolymer (B) in the composition is 10 to 70 wt %, for example 30 to 65 wt % or 40 to 60 wt % with respect to the total composition.

(C) Block Copolymer Comprising a Terminal Block Comprising Styrene or Alpha-Methylstyrene The block copolymer used in the present invention is a block copolymer comprising a terminal block comprising styrene or alpha-methylstyrene. The block copolymer is preferably selected from the group consisting of polystyrene-polybutadiene, polystyrene-poly(ethylene-propylene) (SEP), polystyrene-polyisoprene, poly(alpha-methylstyrene)-polybutadiene, polystyrene-polybutadiene-polystyrene (SBS), polystyrene-poly(ethylene-butylene)-polystyrene (SEBS), polystyrene-poly(ethylene-propylene)-polystyrene, polystyrene-polyisoprene-polystyrene (SIS), poly(alpha-methylstyrene)-polybutadiene-poly(alpha-methylstyrene) and polystyrene-poly(ethylene-propylene-styrene)-polystyrene.

One preferred example of the block copolymer is polystyrene-polyisoprene-polystyrene (SIS). However, preferably, the block copolymer comprises a non-terminal block comprising ethylene, for example selected from the group consisting of polystyrene-poly(ethylene-propylene) (SEP), polystyrene-poly(ethylene-butylene)-polystyrene (SEBS), polystyrene-poly(ethylene-propylene)-polystyrene and polystyrene-poly(ethylene-propylene-styrene)-polystyrene. Most preferably, the block copolymer is polystyrene-poly(ethylene-butylene)-polystyrene (SEBS).

Typically, the block copolymer (C) has a density of 0.800 to 0.900 g/cm$^3$.

Typically, the block copolymer (C) has a melt flow rate of from 1 to 10 dg/min, for example 2 to 5 dg/min as measured according to ISO 1133 using a 2.16 kg weight and at a temperature of 230° C.

The amount of styrene or alpha-methylstyrene in the block copolymer (C) is typically 5 to 40 wt %, for example 10 to 30 wt % or 10 to 20 wt %, based on the block copolymer.

The block copolymer (C) may comprises a non-terminal block comprising ethylene. In this case, the amount of ethylene in the block copolymer may typically be 10-60 wt % based on the block copolymer.

The amount of components of the block copolymer (C), such as ethylene, butylene and styrene or alpha-methylstyrene, may be determined by $^{13}$C NMR measurements, for example according to the following method: The samples are dissolved in $C_2D_2Cl_4$ at 130° C. 2,6-Di-tert-butyl-p-cresol (DBPC) is added as an internal stabilizer. The $^{13}$C NMR measurements are performed on a Bruker500 Avance III NMR spectrometer equipped with a 10 mm-diameter cryo-cooled probehead operating at 125° C. The weight percentage of ethylene, butylene and styrene are obtained by analyzing the $^{13}$C NMR spectra.

Preferably, the amount of the block copolymer (C) in the composition is 5 to 30 wt %, for example 10 to 20 wt % with respect to the total composition.

Preferably, the total of (A), (B) and (C) is at least 90 wt %, at least 95 wt %, at least 98 wt %, at least 99 wt %, at least 99.5 wt %, at least 99.9 wt % or 100 wt % of the total composition.

(D) additives The composition may further comprise (D) optional components different from the propylene-based polymer (A), the copolymer of ethylene and α-olefin comonomer (B) and the block copolymer (C), such as additives, wherein the total of (A), (B), (C) and (D) is 100 wt % of the total composition. Accordingly, the invention relates to a composition consisting of (A), (B), (C) and (D) optional components different from (A), (B) and (C), such as additives.

Preferably, the amount of (D) is up to 5000 ppm, more preferably at most 4000 ppm, more preferably at most 3000 ppm, more preferably at most 2500 ppm, more preferably at most 2000 ppm, more preferably at most 1500 ppm, for example at most 1000 ppm or at most 500 ppm, of the total composition. Typically, the amount of (D) is at least 500 ppm of the total composition. The additives may contain commonly used additives like: phenolic antioxidants phosphorus-containing antioxidants, C-radical scavengers, acid scavengers, UV-stabilisers, antistatic agents, nucleating agents, slip agents, and antiblocking agents. These components are well known for the skilled person and may be used in the common amounts and are selected by the skilled person as they are required and according to the respective purpose for which the polyolefin compositions shall be used. Preferably (D) comprises an acid scavenger, preferably an inorganic based acid scavenger, and an antioxidant. Preferably, the amount of the antioxidant is at most 1500 ppm, for example at most 1000 ppm or at most 500 ppm, of the total composition.

Preferably, the composition is substantially free of nucleating agent or a clarifier. This advantageously makes the composition suitable for use in medical applications. For example, the composition comprises less than 1000 ppm, preferably less than 500 ppm, more preferably less than 250 ppm, most preferably less than 100 ppm of a nucleating agent or a clarifier with respect to the total composition.

For purpose of the invention with nucleating agent is meant any material that effectively accelerates the phase change from liquid polymer to semi-crystalline polymer (evident via faster crystallization rates measured with a differential scanning calorimeter or small crystallites observed with an optical microscope).

Process

The composition of the invention may be obtained by a process comprising melt-mixing components (A), (B) and (C) and optionally component (D) by using any suitable means. Accordingly, the invention further relates to a process for the preparation of the composition according to the invention comprising melt mixing (A), (B), (C) and optionally (D). The melt-mixing of the components may be done in any order.

Preferably, the composition of the invention is made in a form that allows easy processing into a shaped article in a subsequent step, like in pellet or granular form. Preferably, the composition of the invention is in pellet or granular form as obtained by mixing all components in an apparatus like an extruder; the advantage being a composition with homogeneous and well-defined concentrations of the additives.

With melt-mixing is meant that the components (B), (C) and/or (D) are mixed with the component (A) at a temperature that exceeds the melting point of the component (A). Melt-mixing may be done using techniques known to the skilled person, for example in an extruder. Generally, in the process of the invention, melt-mixing is performed at a temperature in the range of 200 to 260° C.

Suitable conditions for melt-mixing, such as temperature, pressure, amount of shear, screw speed and screw design when an extruder is used are known to the skilled person.

Further Aspects

The invention further relates to an article, preferably a film comprising a layer made from the composition according to the invention.

The film may be a monolayer film of a multilayer film. Preferably, the film is a multilayer film, for example a three-layer film.

The film according to the invention may be a multilayer film comprising, in this sequence, a first layer, the layer prepared from the composition according to the invention and a second layer, wherein each of the first layer and the second layer is made from a composition comprising (A') a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms and (C') a block copolymer comprising a terminal block comprising styrene or alpha-methylstyrene. The multilayer film preferably consists of the first layer, the layer prepared from the composition according to the invention and the second layer, but the multilayer film may comprise one or more further layers.

Preferably, the amount of the block copolymer (C') in the composition of the first layer and/or the second layer is 25 to 45 wt % of the total composition of the layer. Preferably, the total amount of (A') and (C') is at least 95 wt %, at least 98 wt % or 100 wt % of the total composition of the layer.

Suitable examples of the propylene-based polymer (A') are the same as the examples described for the propylene-based polymer (A).

Suitable examples of the block polymer (C') are the same as the examples described for the block polymer (C).

The film according to the invention may have a thickness of e.g. 15 to 500 μm, for example 50 to 300 μm.

The first layer and/or the second layer may have a thickness of e.g. 5 to 200 μm, for example 10 to 100 μm, 10 to 30 μm or 30 to 100 μm. The layer used closer to the article to be sealed, which also may be referred as an inner layer, may have a larger thickness than the layer used farther from the article to be sealed, which also may be referred as an outer layer.

The layer made from the composition according to the invention may have a thickness of e.g. 5 to 200 μm, for example 100 to 150 μm.

A particularly preferred embodiment of the multilayer film according to the invention is a three-layer film comprising, in this sequence, a first layer, the layer prepared from the composition according to the invention and a second layer, wherein each of the first layer and the second layer is made from a composition comprising (A') a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms and (C') a block copolymer comprising a terminal block comprising styrene or alpha-methylstyrene, wherein the amount of the block copolymer (C') in the composition of the first layer is 25 to 45 wt % of the total composition of the first layer and the total amount of (A') and (C') is at least 95 wt %, at least 98 wt % or 100 wt % of the total composition of the first layer, wherein the amount of the block copolymer (C') in the composition of the second layer is 25 to 45 wt % of the total composition of the first layer and the total amount of (A') and (C') is at least 95 wt %, at least 98 wt % or 100 wt % of the total composition of the second layer, wherein the film has a thickness of 15 to 500 μm.

In another aspect, the invention relates to a medical article comprising the composition according to the invention or the film according to invention. Preferably, the medical article is chosen from the group of intravenous bags, intravenous tubes, intravenous bottles and dialysis bags.

Preferably, the medical article is a medical article suitable for sterilization at 121° C. or temperatures between 121° C. to 130° C. The suitability can be tested by measuring the concentration of certain ions after soluble testing. Low concentration of certain ions shows that the medical article is suitable for sterilization.

Concentration of Ions after Soluble Testing

The concentration of certain ions can be tested according to the following soluble test. Provide samples of 5 cm*0.5 cm, 200 micrometer and rinse by distilled water. After drying at room temperature, put the sample in a glass bottle of 500 ml and add 200 ml distilled water and make it hermetic. Then put the bottle in a high pressure vaporize sterilization device at 121° C. and heat for 30 minutes. Cool down to room temperature and use the solution for measuring the concentration of ions.

Each of the concentrations of Ba, Cu, Pb, Cr, Cd, Sn and Al ions in the solution can be tested for compliance with medical requirements.

Preferably, each of the concentrations of Ba, Cu, Pb and Cr ions is at most 1 ppm, more preferably at most 0.9 ppm, more preferably at most 0.8 ppm.

Preferably, each of the concentrations of Cd and Sn ions is at most 0.1 ppm, more preferably at most 0.09 ppm, more preferably at most 0.08 ppm.

Preferably, the concentration of Al ion is at most 0.05 ppm, more preferably at most 0.045 ppm, more preferably at most 0.04 ppm.

Accordingly the invention relates to a medical article wherein concentrations of Ba, Cu, Pb, Cr, Cd, Sn and Al ions in a solution obtained from a soluble test using a sample made of the composition according to the invention are measured to be:

each of the concentrations of Ba, Cu, Pb and Cr ions is at most 1 ppm, more preferably at most 0.9 ppm, more preferably at most 0.8 ppm, each of the concentrations of Cd and Sn ions is at most 0.1 ppm, more preferably at most 0.09 ppm, more preferably at most 0.08 ppm and the concentration of Al ion in the solution is at most 0.05 ppm, more preferably at most 0.045 ppm, more preferably at most 0.04 ppm, wherein the soluble test is performed by providing a sample of 5 cm*0.5 cm, 200 micrometer from the composition according to the invention, rinsing the sample by distilled water and drying at room temperature, putting the sample in a glass bottle of 500 ml and adding 200 ml distilled water and making it hermetic, putting the bottle in a high pressure vaporize sterilization device at 121° C. and heating for 30 minutes, cooling the bottle down to room temperature and measuring the concentrations of the ions of the solution in the glass bottle.

The invention further relates to use of the composition according to the invention or the film according to the invention for medical applications, for example intravenous bags, intravenous tubes, intravenous bottles and dialysis bags.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Experiments

Components used in the experiments are summarized in Table 1. In all tables, all % means wt %, unless indicated otherwise.

TABLE 1

| Items | Description |
|---|---|
| Propylene-ethylene copolymer 1 | MFR: 2 g/10 min @ 230 C./2.16 kg, C2%: 3.2%, XS %: 5.85% |

TABLE 1-continued

| Items | Description |
|---|---|
| Ethylene-octene copolymer 1 | C2/C8 elastomer, MFR: 1 g/10 min @ 190 C./2.16 kg, Density 0.857 g/cm3 |
| Ethylene-octene copolymer 2 | C2/C8 elastomer, MFR: 1 g/10 min @ 190 C./2.16 kg, Density 0.863 g/cm3 |
| Ethylene-octene copolymer 3 | C2/C8 elastomer, MFR: 1 g/10 min @ 190 C./2.16 kg, Density 0.868 g/cm3 |
| SEBS 1 | SEBS, MFR: 3.5 g/10 min @ 230° C./2.16 kg, Density 0.89 g/cm3 |

XS % = xylene soluble in wt %
C2% = ethylene content in wt %
MFR was measured according to ISO1133.

Components shown in Table 2 were premixed together and then dosed into the twin-screw extruder through main feeder. The twin-screw extruder used is ZSK26mc with L/D 40 and screw diameter 26 mm. Melting temperature was 220° C. Shear rate was 400 rpm and output was 20 kg/hr. The pellets were used for making the core layer.

Similarly, pellets for making the outer layer were prepared by mixing 70 wt % of propylene-ethylene copolymer 1 and 30 wt % of SEBS1.

Similarly, pellets for making the inner layer were prepared by mixing 60 wt % of propylene-ethylene copolymer 1 and 40 wt % of SEBS1.

A three-layer film was cast from these pellets with LabTech's casting machine. Screw diameter was 30 mm and melting temperature was 240° C. The thicknesses of the layers were: out layer 20 um, core layer 130 um and inner layer 50 um.

Heat sealing using the three-layer film was conducted by Brukker HSG-C with a seal bar of 150*10 mm. Sealing force was 400N and dwell time was 1.5 s. Sealing temperature was 135° C. Sealed samples were cooled at ambient environment for 72 hr before testing or sterilization.

Various properties of the films were tested.

Haze

Haze was tested according to ISO14782 by BYK Haze Gard II. Thickness was 0.2 mm. Specimens were conditioned for 72 hr at 23±1° C. and at relative humidity of 50±5% before testing.

Transmittance

Transmittance was tested according to ISO13468 by BYK Haze Gard II. Thickness was 0.2 mm. Specimens were conditioned for 72 hr at 23±1° C. and at relative humidity of 50±5% before testing.

Tensile Strength and Tensile Modulus

Tensile strength and tensile modulus were tested according to ASTM D638-4, 500 mm/min.

Sealing Strength

Sealing strength was tested according to ASTM F88, 200 mm/min.

TABLE 2

|  |  | Ex 1 | Ex 2 | CEx 3 | CEx 4 | CEx 5 |
|---|---|---|---|---|---|---|
| Propylene-ethylene copolymer 1 | % | 34.9 | 29.9 | 24.9 | 34.9 | 24.9 |
| Ethylene-octene elastomer 1 | % | 50 |  | 65 |  |  |
| Ethylene-octene elastomer 2 | % |  | 55 |  |  |  |

TABLE 2-continued

|  |  | Ex 1 | Ex 2 | CEx 3 | CEx 4 | CEx 5 |
|---|---|---|---|---|---|---|
| Ethylene-octene elastomer 3 | % |  |  |  | 60 | 75 |
| SEBS 1 | % | 15 | 15 | 15 |  |  |
| Primary antioxidant | % | 0.05 | 0.05 | 0.05 | 0.05 | 0.05 |
| Secondary antioxidant | % | 0.05 | 0.05 | 0.05 | 0.05 | 0.05 |
| *Before sterilization* | | | | | | |
| Haze | % | 11.9 | 9 | 6.6 | 8.5 | 7.2 |
| Transmittance | % | 85.5 | 88.4 | 90.9 | 86.5 | 89.6 |
| Tensile strength | MPa | 21 | 21 | 26.3 | 21.1 | 28.4 |
| Tensile modulus | MPa | 115 | 111 | 94 | 125 | 112 |
| Sealing strength | N/15 mm | 38 | 34.3 | 31.8 | 33 | 37.1 |
| *After sterilization* | | | | | | |
| Haze | % | 17.9 | 15.6 | 13.1 | 13.1 | 11.9 |
| Transmittance | % | 83.2 | 85.4 | 88.5 | 84.5 | 88 |
| Tensile strength | MPa | 21.3 | 22.6 | 26.6 | 20.1 | 28.3 |
| Tensile modulus | MPa | 119 | 117 | 114 | 123 | 120 |
| Sealing strength | N/15 mm | 35.5 | 29.6 | 24.3 | 25.5 | 23.3 |
| Sealing strength retention | % | 93.4 | 86.3 | 76.4 | 77.3 | 62.8 |

The decrease in the sealing strength was large for the compositions wherein only an elastomer was used without a block copolymer (CEx 4 and CEx 5). Sealing strength was maintained to a high level for the compositions wherein a block copolymer was used in combination with an elastomer having a relatively low density (Ex1 and Ex2). In the composition wherein a block copolymer was used in combination with an elastomer having a relatively high density (CEx 3), the decrease in the sealing strength was large.

The invention claimed is:

1. A film comprising a layer prepared from a composition comprising:
   (A) a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms,
   (B) an elastomer of ethylene and an α-olefin comonomer having 4 to 10 carbon atoms, wherein the elastomer has a density of 0.850 to 0.865 g/cm$^3$ and a melt flow index of 0.1 to 20 dg/min measured in accordance with ASTM D1238 using a 2.16 kg weight and at a temperature of 190° C. and
   (C) a block copolymer comprising a terminal block comprising styrene or alpha-methylstyrene,
   wherein the film is a multilayer film comprising a first layer and a second layer, wherein the layer prepared from the composition is provided between the first layer and the second layer, wherein each of the first layer and the second layer comprises (A') a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms and (C') a block copolymer comprising a terminal block comprising styrene or alpha-methylstyrene.

2. The film according to claim 1, wherein the amount of (C') is 25 to 45 wt % of the total weight of (A') and (C').

3. A medical article comprising a composition comprising:
- (A) a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms,
- (B) an elastomer of ethylene and an α-olefin comonomer having 4 to 10 carbon atoms, wherein the elastomer has a density of 0.850 to 0.865 g/cm$^3$ and a melt flow index of 0.1 to 20 dg/min measured in accordance with ASTM D1238 using a 2.16 kg weight and at a temperature of 190° C. and
- (C) a block copolymer comprising a terminal block comprising styrene or alpha-methylstyrene.

4. The medical article according to claim 3, wherein the composition further comprises (D) additives, wherein the total of (A), (B), (C) and (D) is 100 wt % of the total composition and the amount of (D) is up to 5000 ppm of the total composition.

5. The medical article according to claim 4, wherein the additives (D) comprise an acid scavenger and an antioxidant.

6. The medical article according to claim 3, wherein the composition comprises less than 1000 ppm of a nucleating agent or a clarifier.

7. The medical article according to claim 3, wherein concentrations of Ba, Cu, Pb, Cr, Cd, Sn and Al ions in a solution obtained from a soluble test using a sample made of the composition are measured to be:
- each of the concentrations of Ba, Cu, Pb and Cr ions is at most 1 ppm,
- each of the concentrations of Cd and Sn ions is at most 0.1 ppm, and
- the concentration of Al ion in the solution is at most 0.05 ppm,
- wherein the soluble test is performed by
- providing a sample of 5 cm*0.5 cm, 200 micrometer from the composition,
- rinsing the sample by distilled water and drying at room temperature,
- putting the sample in a glass bottle of 500 ml and adding 200 ml distilled water and making it hermetic,
- putting the bottle in a high pressure vaporize sterilization device at 121° C. and heating for 30 minutes,
- cooling the bottle down to room temperature and
- measuring the concentrations of the ions of the solution in the glass bottle.

8. The medical article of claim 3, wherein the medical article is an intravenous bag, an intravenous tube, an intravenous bottle, or a dialysis bag.

9. The medical article of claim 3, wherein the medical article comprises a film prepared from the composition.

10. The medical article of claim 9, wherein the medical article is an intravenous bag, an intravenous tube, an intravenous bottle, or a dialysis bag.

11. The medical article of claim 3, wherein the total of (A), (B) and (C) is at least 98 wt % of the total composition.

12. The medical article of claim 3, wherein
- the propylene-based polymer (A) is a propylene copolymer consisting of at least 90 wt % of propylene monomer units and 1 to 10 wt % of ethylene monomer units, the propylene-based polymer (A) having a xylene soluble content at 25° C. of 4 to 10 wt % and a melt flow rate of 1.5 to 10 dg/min, as measured according to ISO1133 (2.16 kg, 230° C.);
- the elastomer (B) is an elastomer of ethylene and 1-octene, wherein the elastomer (B) has a density of 0.850 to 0.860 g/cm$^3$ and a melt flow index of 0.1 to 5 dg/min measured in accordance with ASTM D1238 using a 2.16 kg weight and at a temperature of 190° C. and
- the block copolymer (C) is polystyrene-poly(ethylene-butylene)-polystyrene;
- wherein the amount of the propylene-based polymer (A) is 20 to 40 wt %, the amount of the elastomer (B) is 40 to 60 wt % and the amount of the block copolymer (C) is 10 to 20 wt %, with respect to the total composition; and
- wherein the total of (A), (B) and (C) is at least 95 wt % of the total composition.

* * * * *